July 24, 1956     J. J. DELANY     2,755,671
RESILIENT SEALING UNITS FOR FLUSH VALVE ACTUATORS
Filed Sept. 20, 1951     2 Sheets-Sheet 1
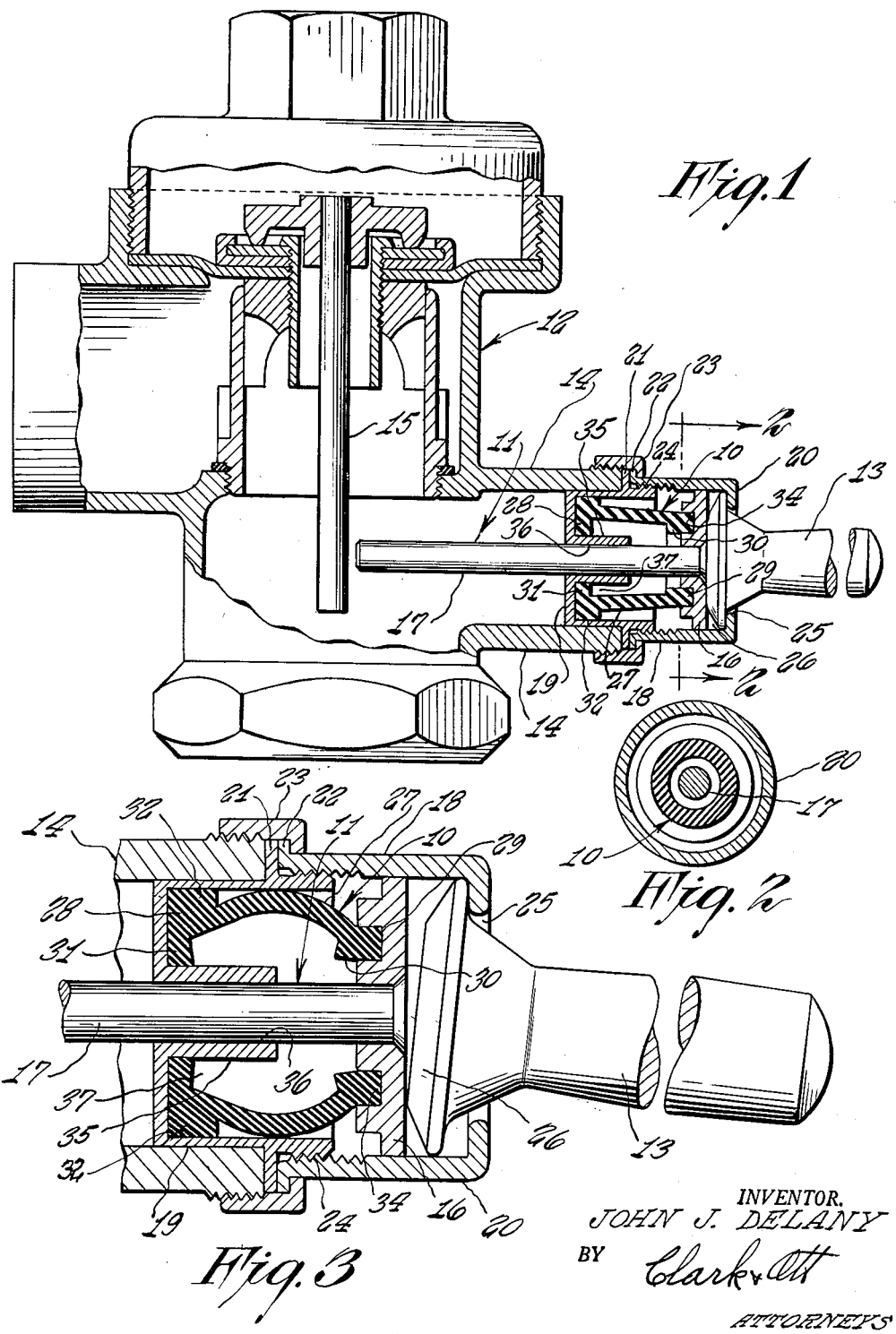
INVENTOR.
JOHN J. DELANY July 24, 1956  J. J. DELANY  2,755,671
RESILIENT SEALING UNITS FOR FLUSH VALVE ACTUATORS
Filed Sept. 20, 1951 2 Sheets-Sheet 2
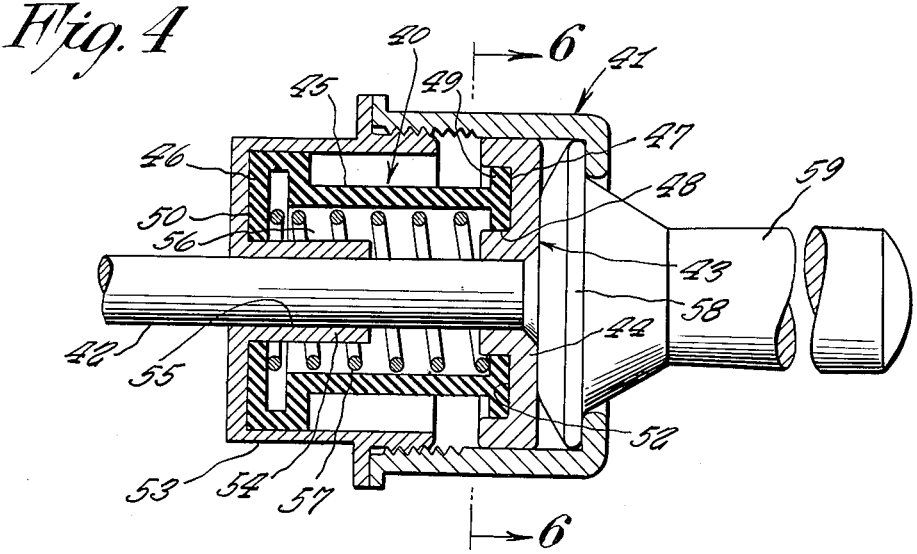
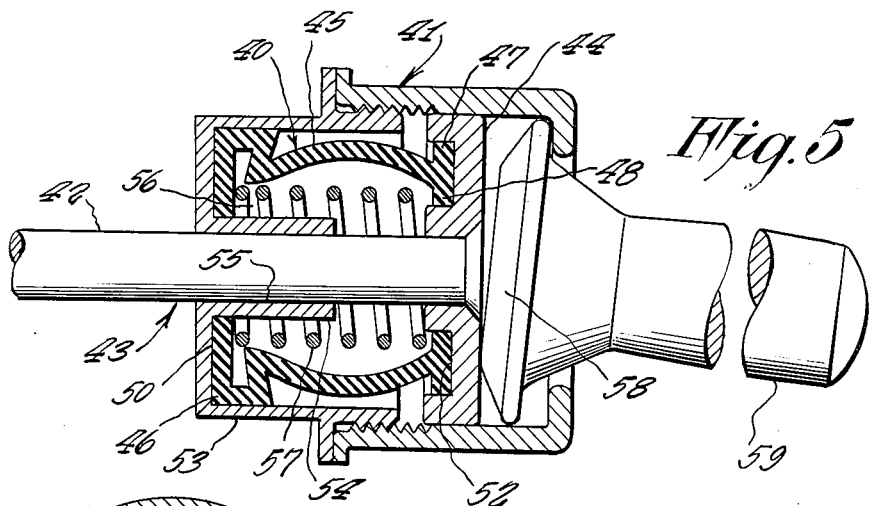
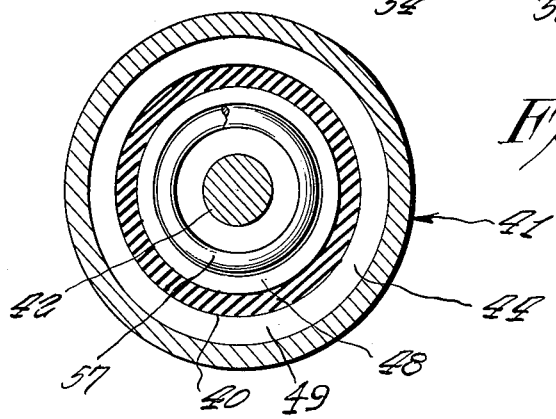
INVENTOR.
JOHN J. DELANY
BY Clark & Ott
ATTORNEYS они
United States Patent Office 2,755,671
Patented July 24, 1956

2,755,671
RESILIENT SEALING UNITS FOR FLUSH VALVE ACTUATORS

John J. Delany, Brooklyn, N. Y., assignor to Delany Realty Corporation, Brooklyn, N. Y., a corporation of New York Application September 20, 1951, Serial No. 247,497

3 Claims. (Cl. 74—18.2)

This invention relates to flush valves and has particular reference to an improved resilient sealing unit for the valve actuator member thereof, which unit is so constructed and arranged as to effectively seal the ends thereof to withstand the maximum pressure of water mains without leaking, while permitting of radial expansion and contraction of the unit with axial contraction and expansion thereof.

The invention is an improvement of the sealing unit described in Letters Patent No. 2,506,140 in which the sealing unit is flatly positioned against the inner face of the head of the actuator member at one end and at the other end has a flanged metallic sleeve embedded therein for slidably receiving the shank of the actuator member. This sealing unit construction is primarily adapted for use in low pressure water lines. The present invention provides an improved construction which is adapted for use in high pressure lines in which the pressure may be as high as 125 pounds per square inch. In this construction the sealing unit has interfitting engagement with the head of the actuator member and with the wall through which the shank of the actuator member has reciprocatory movement whereby the sealing unit is retained in position at its ends and intermediate its ends is radially expansible with the movement of the actuator member to contract the unit and is radially contractable with the movement of the actuator member in the opposite direction to permit of axial expansion of the unit.

Still another object of the invention is to provide a sealing unit of said character in which one end of the sealing unit is fitted in a socket in the inner face of the head of the actuator member and the opposite end thereof is fitted in a socket in the wall through which the actuator member has reciprocatory movement to thereby securely hold the ends of the sealing unit in position to withstand maximum water pressure within the sealing unit.

With the foregoing and other objects in view, reference is now made to the following specification and accompanying drawings in which the preferred embodiments of the invention are illustrated.

In the drawings:

Fig. 1 is a side view of a flush valve with parts broken away and shown in section to illustrate the underlying parts and provided with a sealing unit for the valve actuator member thereof constructed in accordance with the invention.

Fig. 2 is a vertical sectional view taken approximately on the line 2—2 of Fig. 1.

Fig. 3 is an enlarged view of the valve actuator member and associated parts showing the sealing unit in radially expanded relation.

Fig. 4 is a view similar to Fig. 3 embodying a modified form of sealing unit.

Fig. 5 is a view similar to Fig. 4 showing the sealing unit in radially expanded relation.

Fig. 6 is a vertical sectional view taken approximately on the line 6—6 of Fig. 4.

Referring to the drawings by characters of reference, and more particularly to the form of the invention illustrated in Figs. 1 to 3 inclusive thereof, the sealing unit 10 is arranged on the actuator member 11 of a flush valve 12 provided with an operating handle 13 projecting outwardly from the boss 14 located at one side thereof and which handle is disposed in engagement with the actuator member 11 for inward movement thereof to unseat the valve 15. The actuator member 11 is formed with an enlarged head 16 affixed to the outer end of the shank 17 thereof and the same is mounted for reciprocatory movement with the head 16 located in a cylindrical casing 18 with the shank 17 slidably protruding through the inner end thereof into adjacent relation with the stem of the valve 15.

The casing 18 consists of oppositely disposed mating inner and outer sections 19 and 20 having confronting mating annular flanges 21 and 22 which are engaged by a threaded collar 23 for removably securing the casing member on the boss 14 with the section 19 slidably fitting the inner periphery thereof. The section 19 of said casing member is formed with a threaded outer end 24 which is threadedly engaged within the outer section 20 for securing the sections together with the flanges 21 and 22 in tight abutting relation and providing a unit for holding the sealing unit 10, the actuator member 11 and the operating handle 13 in assembled relation. The outer section 20 is formed with an opening 25 in the end wall thereof through which the handle 13 protrudes with the enlarged inner end 26 thereof disposed flatly against the outer end of the head 16 of the actuator member 11.

The sealing unit 10 is fashioned of flexible resilient material such as natural or artificial rubber and the same is of hollow formation and consists of a conical shaped intermediate wall portion 27 and inner and outer end portions 28 and 29 formed integrally with the intermediate portion 27. The intermediate wall portion 27 is flexible to permit of radial expansion thereof with the inward axial contraction of the unit by the canting of the handle 13 as illustrated in Fig. 3 of the drawings. To permit of this radial expansion the said intermediate wall portion is spaced from the peripheral wall of the casing member 18 while the inner and outer end portions 28 and 29 snugly fit in recesses within the casing member. The outer end portion 29 of the sealing unit 10 is formed with an inwardly directed peripheral flange 30 and the inner end portion 28 thereof is formed with inner and outer peripheral flanges 31 and 32 respectively, which flanges provide end walls which are relatively thicker than the wall of said intermediate wall portion 27 of said unit.

In order to retain the end portions 28 and 29 against distortion or outward expansion thereof by the pressure of the water within the unit and by the radial expansion of the intermediate wall portion thereof, the head 16 of the actuator member 11 is formed with an annular recess or channel 34 in the inner face thereof in which the outer end portion 29 of the sealing unit is snugly fitted. The inner casing section 19 of the casing member 18 is formed with an inwardly extending sleeve 35 having an opening 36 through which the shank 17 of the actuator member 11 has free sliding movement. The sleeve 35 together with the peripheral wall of the casing section 19 forms an annular recess 37 in which the inner end portion 28 of the sealing unit 10 is snugly fitted with the inner peripheral flange 31 thereof engaging about the sleeve 35 and the outer peripheral flange 32 engaging against the inner periphery of the peripheral wall of the casing section 19. Constructed in this manner the opposite end portions 28 and 29 of the sealing unit are retained against outward expansion and are forced into the said annular recesses by the pressure of the water against the inwardly directed flanges at the ends thereof so that said end portions are water-tight to thereby prevent leakage of the water from the valve through the unit.

It will be understood that water pressure within the valve may approximate 125 pounds per square inch when installed in water mains in high buildings and the like and that water from within the valve is forced by the pressure thereof through the opening 36 in the sleeve 35 to lodge within the sealing unit 10. With the aforesaid construction and arrangement of the end portions 28 and 29 of the sealing unit 10 in the annular recesses provided within the casing member 18, the sealing unit will withstand the high water pressure within the valve without leaking while the intermediate wall portion 27 thereof will provide a tension on the operating handle 13 to normally maintain the same in outwardly projecting relation in axial alignment with the actuator member 11 and which permits of canting of the handle to angular relation as shown in Fig. 3 of the drawings to unseat the valve element 15 whereby the intermediate wall portion 27 of the unit will expand radially as shown therein.

In the form of the invention illustrated in Figs. 4 to 6 inclusive of the drawings, the sealing unit indicated by the reference character 40 is similarly fashioned from flexible resilient material such as natural or artificial rubber and the like and the same is mounted within a cylindrical casing member 41 similar to the casing member 18 in the previous form of the invention with the sealing unit 40 disposed in surrounding relation with the shank 42 of an actuator member 43 having an enlarged head 44 and which is similar in construction and arrangement to the actuator member 11 in the previous form of the invention.

The sealing unit 40 in this form of the invention is of general cylindrical formation having a normally cylindrical intermediate wall portion 45 and inner and outer end portions 46 and 47 formed integrally with the intermediate wall portion 45. The outer end portion 47 is formed with inwardly and outwardly directed peripheral flanges 48 and 49 while the inner end portion 46 extends outwardly beyond the intermediate wall portion 45 and is formed with an inwardly directed peripheral flange 50. The head 44 of the actuator member 43 is formed with an annular recess or channel 52 in the inner face thereof in which the outer end portion 47 of the sealing unit is snugly fitted. The inner casing section 53 of the cylindrical casing member 41 is formed with a sleeve 54 extending inwardly from the end wall thereof and has an opening 55 through which the shank 42 of the actuator member 43 slidably protrudes. The sleeve 54 together with the peripheral wall of the casing section 53 forms an annular recess 56 at the inner end of the casing section in which the inner end portion 46 of the sealing unit is snugly fitted with the inwardly directed peripheral flange 50 disposed against the end wall of the casing section 53 and engaging the sleeve 54 and the inner periphery of the casing section 53.

In this form of the invention a coil spring 57 is disposed in surrounding relation with the sleeve 54 and with the shank of the actuator member 43 and is tensioned at its ends against the inwardly directed flanges 48 and 50 of the sealing unit 40 to thereby maintain the same in flat engagement against the bottom walls of the recesses 52 and 56 so that the end portions 47 and 46 are water-tight to thereby prevent leakage of the water from the valve through the sealing unit. In this form of the invention as in the previous form, the resilient unit functions to maintain the actuator member 43 in tensioned engagement against the enlarged inner end 58 of the operating handle 59 and which may be canted to move the shank 42 of the actuator member into engagement with the depending stem of the valve element of the flush valve to unseat the same and when this takes place the intermediate wall portion 45 of the sealing unit is radially expanded with the inward contraction thereof, as illustrated in Fig. 5 of the drawings.

What is claimed is:

1. A device for sealing the valve actuator member of a flush valve of the type having a handle for moving the actuator member, said device including a casing comprising inner and outer hollow casing parts, said outer casing part including a peripheral wall and an outer end wall having an opening through which the handle protrudes and said inner casing part including a peripheral wall and an inner end wall provided with a tubular sleeve projecting into said casing and through which sleeve the shank of the actuator member protrudes into the flush valve, a resilient sealing unit arranged within said casing and including an intermediate peripheral wall portion and enlarged inner and outer apertured end portions formed integrally with said peripheral wall portion, said sealing unit surrounding the shank of the actuator member in spaced relation therewith with the enlarged outer end fitting in an annular recess in the inner face of the head of the actuator member and with the enlarged inner end thereof disposed against the end wall of the inner casing part and fitted between the peripheral wall thereof and said sleeve for sealing the ends of the sealing unit against the egress of water, and said sealing unit tensioning said actuator member against said handle with the intermediate peripheral wall portion thereof functioning to expand radially outward with the inward movement of the actuator member.

2. A device for sealing the valve actuator member of a flush valve of the type having a handle for moving the actuator member, said device including a casing comprising inner and outer hollow casing parts, said outer casing part including a peripheral wall and an outer end wall having an opening through which the handle protrudes and said inner casing part including a peripheral wall and an inner end wall provided with a tubular sleeve projecting into said casing and through which sleeve the shank of the actuator member protrudes into the flush valve, a resilient sealing unit arranged within said casing and including an intermediate peripheral wall portion and inwardly directed peripheral flanges formed at the ends of said peripheral wall portion and providing end openings, said sealing unit surrounding the shank of the actuator member in spaced relation therewith with the inwardly directed flange at the outer end thereof fitting in an annular recess in the inner face of the head of the actuator member and with the inwardly directed flange at the inner end disposed against the end wall of the inner casing part and fitted between the peripheral wall thereof and said sleeve for sealing the ends of the sealing unit against the egress of water, and a coiled spring located within said sealing unit and tensioned at its ends against the inwardly directed flanges thereof and tensioning said actuator member against said handle with the intermediate peripheral portion of the sealing unit functioning to expand radially outward with the inward movement of the actuator member.

3. A device for sealing the valve actuator member of a flush valve of the type having a handle for moving the actuator member, said device including a casing comprising inner and outer wall portions forming a part of said flush valve, said outer wall portion having an opening thorugh which the handle protrudes and said inner wall portion including an inner end wall provided with a tubular sleeve projecting into said casing and through which sleeve the shank of the actuator member protrudes into the flush valve, said actuator member including a shank and a head at the outer end thereof having an annular recess in the inner face thereof, a resilient sealing unit arranged between said inner and outer wall portions and including an intermediate peripheral wall portion, an enlarged outer apertured end portion and an inwardly directed peripheral flange at the inner end thereof providing an inner end opening, said sealing unit surrounding the shank of the actuator member in spaced relation therewith with the enlarged outer end thereof fitting in the annular recess in the inner face of the head of the actuator member and with the inwardly directed flange at the inner end thereof disposed against the end wall of the inner wall portion and fitted about said sleeve for sealing the ends of the sealing unit against the egress of water, and said sealing unit tensioning said actuator member against said handle with the intermediate peripheral wall portion thereof functioning to expand radially outward with the inward movement of the actuator member.

References Cited in the file of this patent

UNITED STATES PATENTS

| | | |
|---|---|---|
| 1,416,317 | Banta | May 16, 1922 |
| 1,516,814 | Flynn | Nov. 25, 1924 |
| 2,019,257 | Gibbs | Oct. 29, 1935 |
| 2,172,079 | Boehm | Sept. 5, 1939 |
| 2,212,607 | Langdon | Aug. 27, 1940 |
| 2,506,140 | Delany | May 2, 1950 |

FOREIGN PATENTS

| | | |
|---|---|---|
| 519,685 | Germany | Mar. 3, 1931 |
| 499,150 | Great Britain | Jan. 19, 1939 |